(12) United States Patent
Yin et al.

(10) Patent No.: US 12,172,532 B2
(45) Date of Patent: Dec. 24, 2024

(54) ELECTRICALLY EXCITED MOTOR DRIVE SYSTEM INTEGRATED WITH OBC, AND ELECTRIC VEHICLE

(71) Applicant: Huawei Digital Power Technologies Co., Ltd., Shenzhen (CN)

(72) Inventors: Xiaode Yin, Shenzhen (CN); Shaohua Wang, Shenzhen (CN); Jinhua Chen, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 500 days.

(21) Appl. No.: 17/666,800

(22) Filed: Feb. 8, 2022

(65) Prior Publication Data
US 2022/0212548 A1    Jul. 7, 2022

(30) Foreign Application Priority Data

Feb. 9, 2021    (CN) .......................... 202110180410.9

(51) Int. Cl.
*B60L 50/61*    (2019.01)
*H02M 1/42*    (2007.01)

(52) U.S. Cl.
CPC .............. *B60L 50/61* (2019.02); *H02M 1/42* (2013.01); *B60L 2210/30* (2013.01); *B60L 2210/40* (2013.01)

(58) Field of Classification Search
USPC ................ 320/103, 104, 105, 106, 107, 108
See application file for complete search history.

(56) References Cited

U.S. PATENT DOCUMENTS

| | | | |
|---|---|---|---|
| 2012/0235626 A1* | 9/2012 | Oh ....................... | H02M 3/3353 320/103 |
| 2017/0320396 A1 | 11/2017 | Kim et al. | |
| 2019/0148973 A1 | 5/2019 | Kim | |
| 2020/0212817 A1* | 7/2020 | Sun ....................... | H02M 1/083 |
| 2021/0016672 A1 | 1/2021 | Zhu et al. | |

(Continued)

FOREIGN PATENT DOCUMENTS

| | | |
|---|---|---|
| CN | 203225631 U | 10/2013 |
| CN | 108202642 A | 6/2018 |
| CN | 108688490 A | 10/2018 |

(Continued)

*Primary Examiner* — Brian Ngo
(74) *Attorney, Agent, or Firm* — WOMBLE BOND DICKINSON (US) LLP

(57) ABSTRACT

An electrically excited motor drive system is integrated with an on-board charger (OBC), so that a power supply circuit that is in an electric vehicle and that is configured to drive an electrically excited motor can be integrated with an OBC of a dual active bridge (DAB) type. When a control component controls a switch circuit, the electrically excited motor drive system obtained after integration can separately implement a function of the power supply circuit or a function of the charging circuit in different working modes. In addition, when the electrically excited motor drive system is in different working modes, some circuits are further reused through time division. This addresses a problem that the power supply circuit cannot be integrated with the OBC of the DAB type, to reduce circuit complexity and costs of the electric vehicle.

18 Claims, 7 Drawing Sheets

(56) References Cited

U.S. PATENT DOCUMENTS

2023/0134008 A1* 5/2023 Jabez Dhinagar .... H02J 7/0013
                                                        320/107

FOREIGN PATENT DOCUMENTS

| CN | 209571933 U | 11/2019 |
|----|-------------|---------|
| CN | 210970706 U | 7/2020 |
| CN | 111510030 A | 8/2020 |
| EP | 3238979 A1 | 11/2017 |
| EP | 3972119 A1 | 3/2022 |
| WO | 2020242444 A1 | 12/2020 |

* cited by examiner

ELECTRICALLY EXCITED MOTOR DRIVE SYSTEM INTEGRATED WITH OBC, AND ELECTRIC VEHICLE

CROSS-REFERENCE TO RELATED APPLICATIONS

This application claims priority to Chinese Patent Application No. 202110180410.9, filed on Feb. 9, 2021, which is hereby incorporated by reference in its entirety.

TECHNICAL FIELD

This application relates to the field of electric vehicle technologies, and in particular, to an electrically excited motor drive system integrated with an on-board charger (OBC), and an electric vehicle.

BACKGROUND

A motor is a core component in an electric vehicle, and is configured to provide power for the electric vehicle. To drive the motor, a motor drive system is further disposed in the electric vehicle as a power supply circuit, and is configured to: obtain electric energy from an electric power storage component such as a battery, and then drive an electrically excited motor to rotate and work, to provide running power for the electric vehicle. In addition, a charging circuit for charging the electric power storage component further needs to be disposed in the electric vehicle. When a charging port of the electric vehicle is connected to an external power supply, the external power supply charges the electric power storage component by using the charging port and the charging circuit.

Therefore, at present, the power supply circuit and the charging circuit are separately disposed in the electric vehicle. This greatly increases circuit complexity of the electric vehicle, and increases design and production costs of the electric vehicle.

SUMMARY

This application provides an electrically excited motor drive system integrated with an OBC, and an electric vehicle, to resolve a technical problem that a power supply circuit disposed in the electric vehicle cannot be integrated with a charging circuit, so as to reduce circuit complexity and design and production costs of the electric vehicle.

A first aspect of this application provides an electrically excited motor drive system integrated with an OBC, so that a power supply circuit that is in an electric vehicle and that is configured to drive an electrically excited motor can be integrated with a charging circuit of an electric power storage component. The system includes: a power factor correction circuit, a first electric energy conversion circuit, a first transformer, a second electric energy conversion circuit, a third electric energy conversion circuit, a switch circuit, an excitation drive component, and a control component. The switch circuit may be configured to switch a working state of the system, so that the system implements a function of the power supply circuit or a function of the charging circuit.

An embodiment of a connection relationship is as follows: A first terminal of the power factor correction circuit is connected to a charging port of the electric vehicle, a second terminal of the power factor correction circuit is connected to a first terminal of the first electric energy conversion circuit, and a second terminal of the first electric energy conversion circuit is connected to a primary-side winding of the first transformer. A first secondary-side winding of the first transformer is connected to a first terminal of the second electric energy conversion circuit, and a second terminal of the second electric energy conversion circuit is connected to a first electric power storage component of the electric vehicle. A second secondary-side winding of the first transformer is connected to a first terminal of the third electric energy conversion circuit, and a second terminal of the third electric energy conversion circuit is connected to a second electric power storage component of the electric vehicle. The first terminal of the second electric energy conversion circuit is further connected to a first terminal of the switch circuit, and the first terminal of the switch circuit is further connected to a specified winding of the first transformer. A second terminal of the switch circuit is connected to a first terminal of the excitation drive component, and a second terminal of the excitation drive component is connected to the electrically excited motor of the electric vehicle. The control component is connected to a control terminal of the switch circuit.

When the electric vehicle is not started, the switch circuit is turned off, and the power factor correction circuit, the first electric energy conversion circuit, the first transformer, the second electric energy conversion circuit, and the third electric energy conversion circuit may jointly form a charging circuit. The bidirectional charging circuit may also be referred to as an OBC. In this way, after the power factor correction circuit receives alternating current power that is output by the charging port, the alternating current power can be converted successively by using the first electric energy conversion circuit, the first transformer, the second electric energy conversion circuit, and the third electric energy conversion circuit. Then, the second electric energy conversion circuit charges the first electric power storage component connected to the second electric energy conversion circuit, and the third electric energy conversion circuit charges the second electric power storage component connected to the third electric energy conversion circuit.

When the electric vehicle is started, the switch circuit is turned on, and the second electric energy conversion circuit, the switch circuit, the excitation drive component, the electrically excited motor, and the third electric energy conversion circuit may jointly form a power supply circuit that supplies power to the electrically excited motor. Direct current power provided by the first electric power storage component is converted successively by using the second electric energy conversion circuit, the switch circuit, and the excitation drive component, to supply power to the electrically excited motor. The direct current power provided by the first electric power storage component can be further converted successively by using the second electric energy conversion circuit, the first transformer, and the third electric energy conversion circuit, to supply power to the second electric power storage component.

Therefore, according to the system provided in this embodiment, a state of the system can be switched by turning off or turning on the switch circuit, so that the system can implement functions of both the power supply circuit and the charging circuit. In addition, there is a shared part such as the second electric energy conversion circuit and the first transformer in the power supply circuit and the charging circuit. Therefore, this reduces system complexity and complexity of the electric vehicle, to reduce design and production costs of the electric vehicle.

In an embodiment of the first aspect of this application, the excitation drive component of the electrically excited motor drive system includes a second transformer and a fourth electric energy conversion circuit. The second transformer is configured to: change a voltage of alternating current power from the second electric energy conversion circuit, and then transmit the alternating current power to the fourth electric energy conversion circuit, so that the fourth electric energy conversion circuit converts the alternating current power into direct current power, to supply power to the electrically excited motor. According to the system provided in this embodiment, a power supply circuit can be provided for the electrically excited motor. In this way, after the electric vehicle is started, direct current power provided by the power storage component of the electric vehicle can be converted into alternating current power and then into direct current power, to supply power to the electrically excited motor. Therefore, when the control component controls the switch circuit, the system has a drive function of driving the electrically excited motor.

In an embodiment of the first aspect of this application, the specified winding of the first transformer that is connected to the first terminal of the switch circuit may be the first secondary-side winding. In this case, the first terminal of the switch circuit is further connected to the second electric energy conversion circuit. In this way, when the first electric power storage component supplies power to the electrically excited motor by using the second electric energy conversion circuit, the second electric energy conversion circuit may directly output alternating current power to a primary-side winding of the second transformer, and the second transformer changes a voltage of the alternating current power and then outputs the alternating current power to the fourth electric energy conversion circuit. The second electric energy conversion circuit is further connected to the first electric power storage component, and may be configured to convert electric energy when the first electric power storage component is charged. Therefore, in this embodiment, the second electric energy conversion circuit can be shared in the power supply circuit and the charging circuit.

In an embodiment of the first aspect of this application, the fourth electric energy conversion circuit in the excitation drive component may be a full-bridge metal-oxide semiconductor (MOS) transistor rectifier circuit. In addition, in this embodiment, electric energy conversion circuits connected to the charging port, the first electric power storage component, the second electric power storage component, and the electrically excited motor all may be full-bridge MOS transistor rectifier circuits. In this way, working modes of all the electric energy conversion circuits during rectification are of an active controllable type. In addition, when the first electric power storage component supplies power to the electrically excited motor, electric energy conversion circuits on two sides of the second transformer may be implemented by using a dual active bridge (DAB) topology. Therefore, this resolves a problem that the power supply circuit that is in the electric vehicle and that supplies power to the electrically excited motor cannot be integrated with the OBC of the DAB type, to reduce circuit complexity and costs of the electric vehicle, and further improve experience of a user whose purchases the electric vehicle.

In an embodiment of the first aspect of this application, the excitation drive component that supplies power to the electrically excited motor further includes a rectifier control component that may be configured to control, based on a rectifier instruction of a motor control unit (MCU), MOS transistors in the full-bridge MOS transistor rectifier circuit to be turned on or turned off, to implement active control of the MOS transistor when alternating current power that flows through the full-bridge MOS transistor rectifier circuit is converted into direct current power.

In an embodiment of the first aspect of this application, the fourth electric energy conversion circuit in the excitation drive component may be a full-bridge diode rectifier circuit. In this case, the excitation drive component further includes a capacitor. Because the capacitor is added, an LLC topology structure including a capacitor and a diode is used for the excitation drive component. Due to a diode rectifier structure, the circuit is simpler and costs are lower. However, correspondingly, because the fourth electric energy conversion circuit cannot adjust a frequency of alternating current power, the control component needs to adjust the frequency of the alternating current power. Therefore, an OBC controller performs more control to further reduce circuit complexity.

In an embodiment of the first aspect of this application, the specified winding of the first transformer that is connected to the first terminal of the switch circuit may be a third secondary-side winding of the first transformer, and the third secondary-side winding is independent of the first secondary-side winding and the second secondary-side winding. In this way, when the first electric power storage component supplies power to the electrically excited motor by using the system, power is processed by using the second secondary-side winding and the third secondary-side winding of the first transformer, and then is input to the excitation drive component. In this case, the second secondary-side winding is functionally equivalent to a "primary-side winding" that is of a transformer and that exists when alternating current power is transmitted, so that the second secondary-side winding of the first transformer can be reused in the charging circuit and the power supply circuit. This also reduces circuit complexity and enriches a circuit reuse manner.

In an embodiment of the first aspect of this application, the fourth electric energy conversion circuit in the excitation drive component may be a full-bridge diode rectifier circuit, and the switch circuit includes a voltage regulation circuit that may be configured to regulate a voltage of alternating current power that is input to the second transformer. In this case, the fourth electric energy conversion circuit is a full-bridge diode rectifier circuit and cannot directly adjust a frequency. Therefore, the frequency of the alternating current power is adjusted by regulating the voltage by the voltage regulation circuit, so that a frequency of alternating current power on two sides of the second transformer is adjustable. In this way, electric energy conversion circuits on the two sides of the second transformer are implemented by using controllable DAB topologies on the two sides. This enriches an embodiment of a circuit structure of the electrically excited motor drive system, and also increases design flexibility.

In an embodiment of the first aspect of this application, the control component includes an OBC controller that may be configured to receive a switching instruction of the MCU, and control, based on the switching instruction, the switch circuit to be turned on or turned off. For example, when detecting that there is an alternating current at the charging port of the electric vehicle, the OBC controller may control the switch circuit to be turned off, so that the system implements the function of the charging circuit, and an external alternating current power supply can charge the first electric power storage component by using the charging circuit. After detecting a start signal of the electric vehicle or another signal that can be used to determine that the electric vehicle is started, the OBC controller may control the switch circuit to be turned on, so that the system implements the function of the power supply circuit, and the first electric power storage component can supply power to the electrically excited motor by using the power supply circuit.

A second aspect of this application provides an electric vehicle, including the electrically excited motor drive system integrated with an OBC provided in any one of the embodiments of the first aspect of this application. Because circuit complexity of the electrically excited motor drive system integrated with an OBC is low, overall circuit complexity of the electric vehicle provided in this embodiment and design and production costs of the electric vehicle are reduced.

DESCRIPTION OF EMBODIMENTS

The following clearly describes the technical solutions in the embodiments of this application with reference to the accompanying drawings in the embodiments of this application. It is clear that the described embodiments are merely some but not all of the embodiments of this application. All other embodiments obtained by a person of ordinary skill in the art based on the embodiments of this application without creative efforts shall fall within the protection scope of this application.

In this specification, the claims, and the accompanying drawings of this application, terms "first", "second", "third", "fourth", and the like (if present) are intended to distinguish between similar objects but do not necessarily indicate a specific order or sequence. It should be understood that the data termed in such a way are interchangeable in proper circumstances, so that the embodiments of this application described herein can be implemented in orders except the order illustrated or described herein. Moreover, the terms "include", "contain" and any other variants mean to cover non-exclusive inclusion. For example, a process, method, system, product, or device that includes a list of steps or units is not necessarily limited to those expressly listed steps or units, but may include other steps or units that are not expressly listed or inherent to the process, method, product, or device.

Figure 1:
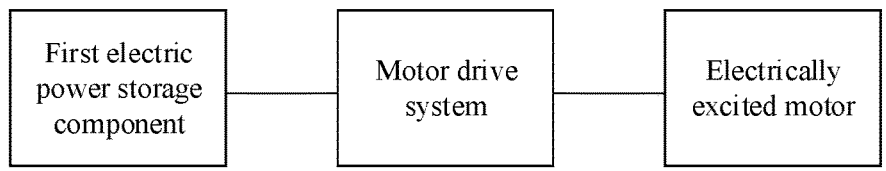
FIG. 1 is a schematic diagram of a structure of an embodiment of an electric vehicle according to this application.

This application may be applied to an electric vehicle. FIG. 1 is a schematic diagram of a structure of an embodiment of an electric vehicle according to this application. The electric vehicle shown in FIG. 1 includes a first electric power storage component, a motor drive system, and a motor. The first electric power storage component may be a battery, and the motor drive system may be configured to obtain electric energy provided by the battery, to drive the motor of the electric vehicle to work, so that the motor provides running power for the electric vehicle. In addition, as the motor continuously develops in a direction of high efficiency, low costs, and miniaturization, increasingly more electrically excited motors are used as motors of electric vehicles due to characteristics such as an adjustable excitation, a wide speed adjustment range, and high efficiency at a high speed.

Figure 2:
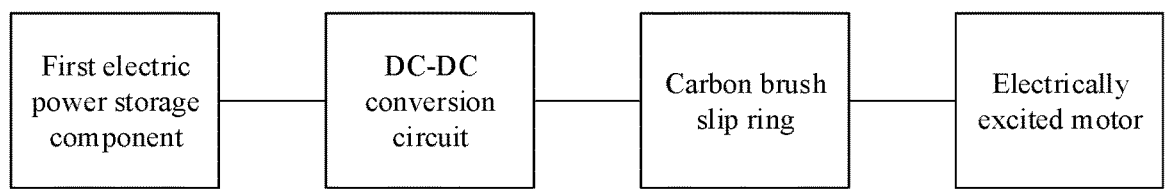
FIG. 2 is a schematic diagram of a structure of an electric vehicle in which a motor drive system of a carbon brush slip ring type is used.

Generally, a motor drive system of the electrically excited motor may include the following two types: a carbon brush slip ring type and a power electronics transformer type. FIG. 2 is a schematic diagram of a structure of an electric vehicle in which a motor drive system of a carbon brush slip ring type is used. The motor drive system shown in FIG. 2 includes a DC-DC conversion circuit and a carbon brush slip ring. The DC-DC conversion circuit may be configured to: convert electric energy of the first electric power storage component into adjustable direct current power, and then transmit the direct current power to a rotor of the electrically excited motor by using the carbon brush slip ring or another form of a rotary electrical contactor. The electrically excited motor includes a fixed stator and a rotatable rotor. Pairs of magnetic poles are disposed on the stator, and each pair of magnetic poles is paired with the rotor. In this case, after a direct current power is supplied to the rotor, a magnetic field generated by the magnetic poles on the stator generates induced electromotive force on the rotor, to drive the rotor to rotate, so as to provide power for the electric vehicle. However, the carbon brush slip ring used in the motor drive system shown in FIG. 2 has a limited service life, and has large electrical noise, a high wear rate, large contact resistance, and the like. As a result, this greatly reduces reliability of the motor drive system of the carbon brush slip ring type.

Figure 3:
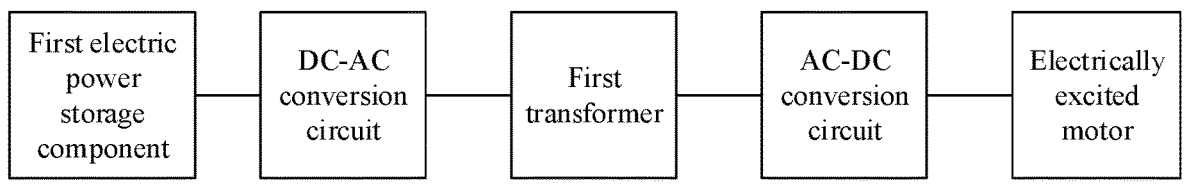
FIG. 3 is a schematic diagram of a structure of an electric vehicle in which a motor drive system of a power electronics transformer type is used.

However, a motor drive system of the power electronics transformer type may transmit direct current power through wireless electric energy transmission, so that the motor drive system of the power electronics transformer type becomes a choice for the motor drive system of the electric vehicle. For example, FIG. 3 is a schematic diagram of a structure of an electric vehicle in which a motor drive system of a power electronics transformer type is used. The motor drive system shown in FIG. 3 includes a DC-AC conversion circuit, a first transformer, and an AC-DC conversion circuit. The first transformer includes an iron core, a primary-side winding around one side of the iron core, and a secondary-side winding around the other side of the iron core. The primary-side winding and the secondary-side winding are not in contact with each other. In this case, the DC-AC conversion circuit may be configured to: convert, into high-frequency alternating current power, direct current power that is output by the first electric power storage component, and transmit electric energy to the primary-side winding of the first transformer in a wireless manner. Alternating current flux can be generated in the iron core due to the alternating current power that flows through the primary-side winding. Alternating current power can be further generated on the secondary-side winding due to the alternating current flux, and is transmitted to the AC-DC conversion circuit. Then, the AC-DC conversion circuit may be configured to: convert the alternating current power into direct current power, and then transmit the direct current power to the rotor of the electrically excited motor to drive the rotor to rotate, so as to provide power for the electric vehicle. In this case, for the entire electric vehicle shown in FIG. 3, in a process in which the first electric power storage component supplies power to the electrically excited motor by using the motor drive system, the first electric power storage component is connected to the primary-side winding of the first transformer, and the electrically excited motor is connected to the secondary-side winding of the first transformer. When the first electric power storage component and the electrically excited motor are not in direct contact with each other, electric energy can be further transmitted between the first electric power storage component and the electrically excited motor in a "wireless"-like transmission manner between the primary-side winding and the secondary-side winding of the first transformer. Therefore, this avoids a service life limitation caused when the carbon brush slip ring is used in the motor drive system in FIG. 2. In addition, because electric energy is transmitted in the electric vehicle in a form of alternating current power, a lower transmission loss and higher transmission efficiency can be further obtained, so that reliability of the motor drive system is improved.

In the embodiments of this application, the motor drive system of the power electronics transformer type shown in FIG. 3 is used as an example to describe the motor drive system, and a type of the motor drive system is not limited.

FIG. 1 to FIG. 3 show a structure that is in the electric vehicle and in which the first electric power storage component supplies power to the electrically excited motor by using the motor drive system. The first electric power storage component and the motor drive system may be referred to as a "power supply circuit" of the electrically excited motor based on a function. To charge the first electric power storage component, a corresponding "charging circuit" further needs to be disposed in the electric vehicle.

Figure 4:
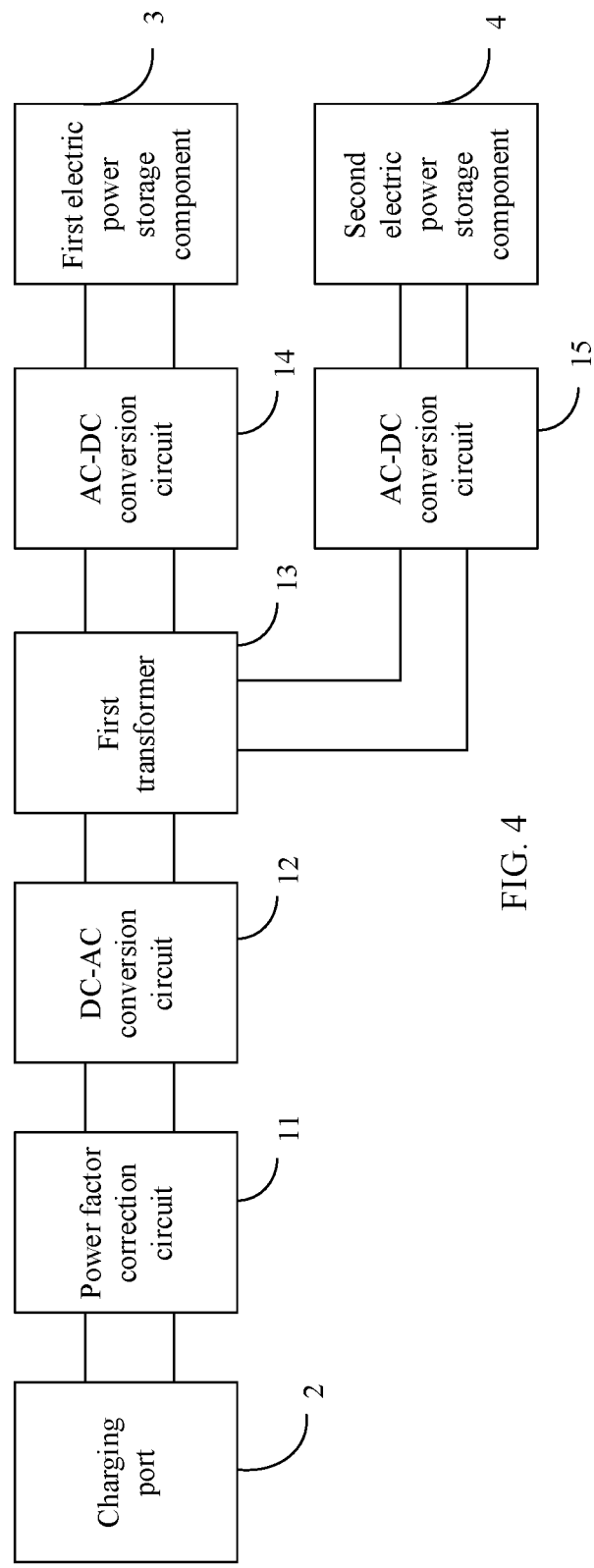
FIG. 4 is a schematic diagram of a structure of a charging circuit of an electric vehicle.

For example, FIG. 4 is a schematic diagram of a structure of a charging circuit of an electric vehicle. FIG. 4 is a schematic diagram of a structure of a charging circuit that is in an electric vehicle and that charges at least two electric power storage components. The electric vehicle includes at least a first electric power storage component 3 and a second electric power storage component 4. Each electric power storage component may be configured to supply power to a load (the load includes an electrically excited motor, an air conditioner, a sound box, and the like) in the electric vehicle. Further, the first electric power storage component 3 may be further configured to supply power to the electrically excited motor in the electric vehicle. In this case, in some scenarios, after alternating current power provided by an external power supply is supplied to a charging port 2 of the electric vehicle, the charging circuit may be configured to simultaneously charge the first electric power storage component 3 and the second electric power storage component 4. In some other scenarios, the first electric power storage component 3 may further charge a device connected to the charging port 2 and the second electric power storage component 4 by using the charging circuit. The charging circuit that is shown in FIG. 4 and that can implement bidirectional electric energy transmission between the charging port 2 and the two electric power storage components may also be referred to as a bidirectional charging circuit, a bidirectional charger, an on-board charger (OBC), or the like.

In the example shown in FIG. 4, the charging circuit of the electric vehicle may include: a power factor correction (PFC) circuit 11, a DC-AC conversion circuit 12, a first transformer 13, an AC-DC conversion circuit 14, and an AC-DC conversion circuit 15. When the electric vehicle charges the electric power storage component by using the charging port, the PFC circuit 11 may be configured to: receive alternating current power from the charging port 2, then convert the alternating current power into direct current power, perform power factor correction processing on the direct current power, and send the direct current power to the DC-AC conversion circuit 12. In some embodiments, the PFC circuit 11 may not be disposed in the charging circuit. Then, the DC-AC conversion circuit 12 converts the direct current power into alternating current power, and then sends the alternating current power to a primary-side winding of the first transformer 13. The first transformer 13 includes a first secondary-side winding and a second secondary-side winding. After the alternating current power is supplied to the primary-side winding, alternating current power can be generated on both of the two secondary-side windings due to alternating current flux generated in an iron core, and is separately sent to a corresponding AC-DC conversion circuit. The AC-DC conversion circuit 14 converts received alternating current power of the first secondary-side winding into direct current power, and then sends the direct current power to the first electric power storage component 3, to charge the first electric power storage component 3. The AC-DC conversion circuit 15 converts received alternating current power of the second secondary-side winding into direct current power, and then sends the direct current power to the second electric power storage component 4, to charge the second electric power storage component 4. When the electric vehicle charges another electric vehicle by using the charging port, the first electric power storage component 3 may provide direct current power for the AC-DC conversion circuit 14. The AC-DC conversion circuit 14 converts the direct current power into alternating current power, and then sends the alternating current power to the first secondary-side winding of the first transformer 13. After the alternating current power is supplied to the first secondary-side winding, alternating current power can be generated on the primary-side winding of the first transformer 13 due to the alternating current flux generated in the iron core, and is sent to the DC-AC conversion circuit 12. The DC-AC conversion circuit 12 converts the alternating current power into direct current power, and then sends the direct current power to the power factor correction circuit 11. The power factor correction circuit 11 converts the direct current power into alternating current power, and then sends the alternating current power to the charging port 2, to charge the device connected to the charging port 2. In addition, after the alternating current power is supplied to the first secondary-side winding, alternating current power can be further generated on the second secondary-side winding of the first transformer 13 due to the alternating current flux generated in the iron core, and is sent to the AC-DC conversion circuit 15. The AC-DC conversion circuit 15 converts the received alternating current power of the second secondary-side winding into direct current power, and then sends the direct current power to the second electric power storage component 4, to charge the second electric power storage component 4.

Figure 5:
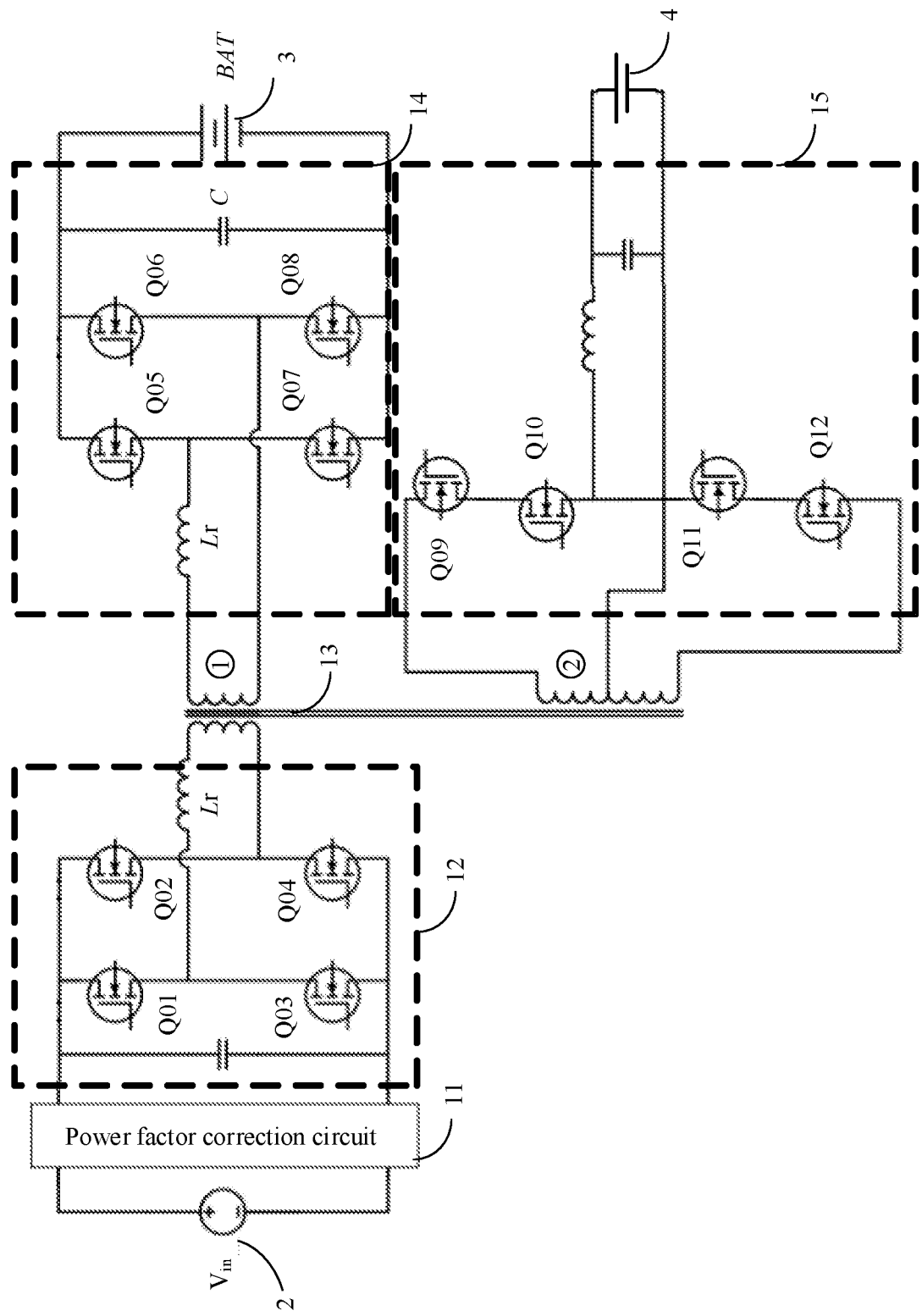
FIG. 5 is a schematic diagram of a circuit structure of a charging circuit.

In some embodiments, FIG. 5 is a schematic diagram of a circuit structure of a charging circuit, and shows a possible circuit embodiment of the charging circuit in FIG. 4. A direct current-direct current converter structure of a series dual active bridge (DAB) topology type may be used for the charging circuit shown in FIG. 5. Specifically, a DAB topology means that in the foregoing charging circuit, the DC-AC conversion circuit 12, the AC-DC conversion circuit 14, and the AC-DC conversion circuit 15 that are connected on two sides of the first transformer 13 are all implemented by using a full-bridge metal-oxide semiconductor (MOS) transistor rectifier circuit (including four controllable MOS transistors). In this way, when electric energy is transmitted between the charging port 2, the first electric power storage component 3, and the second electric power storage component 4 that are connected to the foregoing conversion circuits, the electric energy may be converted by using a full-bridge MOS transistor rectifier circuit connected to each of the charging port 2, the first electric power storage component 3, and the second electric power storage component 4. A MOS transistor has a low resistance during turn-on. Therefore, when rectification is performed by using the MOS transistor rectifier circuit, there are characteristics such as a low electric energy loss and high conversion efficiency while electric energy can be converted.

More specifically, a working principle of the full-bridge MOS transistor rectifier circuit is described by using the DC-AC conversion circuit 12 as an example. For example, in the charging circuit shown in FIG. 5, the DC-AC conversion circuit 12 includes a MOS transistor Q01, a MOS transistor Q02, a MOS transistor Q03, a MOS transistor Q04, and a controller (the controller may be a drive IC or the like, and is not shown in the figure). The controller is connected to a control terminal of each of the MOS transistor Q01, the MOS transistor Q02, the MOS transistor Q03, and the MOS transistor Q04. A first terminal of the MOS transistor Q01 is connected to a first terminal of the power factor correction circuit 11, and a second terminal of the MOS transistor Q01 is connected to a first terminal of the primary-side winding of the first transformer 13. A first terminal of the MOS transistor Q02 is connected to the first terminal of the power factor correction circuit 11, and a second terminal of the MOS transistor Q02 is connected to a second terminal of the primary-side winding of the first transformer 13. A first terminal of the MOS transistor Q03 is connected to the first terminal of the primary-side winding of the first transformer 13, and a second terminal of the MOS transistor Q03 is connected to a second terminal of the power factor correction circuit 11. A first terminal of the MOS transistor Q04 is connected to the second terminal of the primary-side winding of the first transformer 13, and a second terminal of the MOS transistor Q04 is connected to the second terminal of the power factor correction circuit 11. In this case, when the DC-AC conversion circuit 12 receives direct current power that is sent by the power factor correction circuit 11 and whose first terminal is positive and second terminal is negative, in a first cycle (denoted as a positive half cycle of alternating current power), the controller controls the MOS transistor Q01 and the MOS transistor Q04 to be turned on, so that the alternating current power whose first terminal is positive and second terminal is negative is transmitted to the primary-side winding of the first transformer 13. In a second cycle (denoted as a negative half cycle of alternating current power), the controller controls the MOS transistor Q02 and the MOS transistor Q03 to be turned on, so that alternating current power whose first terminal is negative and second terminal is positive is transmitted to the primary-side winding of the first transformer 13. In this way, in an entire cycle of alternating current power, alternating current power to be transmitted to the primary-side winding is formed, and positive and negative electrodes of the alternating current power alternate based on the first cycle and the second cycle.

In conclusion, both the power supply circuit that is shown in FIG. 3 and in which the power storage component supplies power to the electrically excited motor and the charging circuit that is shown in FIG. 4 or FIG. 5 and in which the electric power storage component is charged by using the charging port may be disposed in the electric vehicle. Therefore, the first electric power storage component needs to supply power to the electrically excited motor by using the power supply circuit shown in FIG. 3, and also needs to be charged by using the charging circuit shown in FIG. 4 or FIG. 5. Even if some circuits with a same function exist in both the charging circuit and the power supply circuit, for example, the AC-DC conversion circuit and the first transformer, a conventional technology still lacks a solution for combining the charging circuit and the power supply circuit. As a result, if the power supply circuit and the charging circuit are separately disposed in the electric vehicle, circuit complexity of the electric vehicle is greatly increased, and design and production costs of the electric vehicle are increased.

Therefore, this application provides an electrically excited motor drive system integrated with an OBC (which may be briefly referred to as an electrically excited motor drive system), and an electric vehicle, so that some circuits in the power supply circuit shown in FIG. 3 and the charging circuit shown in FIG. 4 or FIG. 5 can be integrated and reused through time division. In this way, the some circuits can convert, in a process of driving the electrically excited motor, electric energy required for driving, and convert, in a bidirectional charging process, electric energy required for charging, to simplify a circuit structure and reduce costs of the electric vehicle. Further, in this application, when an OBC of the DAB-type topology is used as the charging circuit, the OBC can be further integrated with the motor drive system of the electrically excited motor, to share some circuits, and resolve a technical problem that the power supply circuit is not integrated with the OBC of the DAB type.

The following describes in detail the technical solutions of this application by using example embodiments. The following example embodiments may be combined with each other. For a same or similar concept or process, details are possibly not described again in some embodiments.

Figure 6:
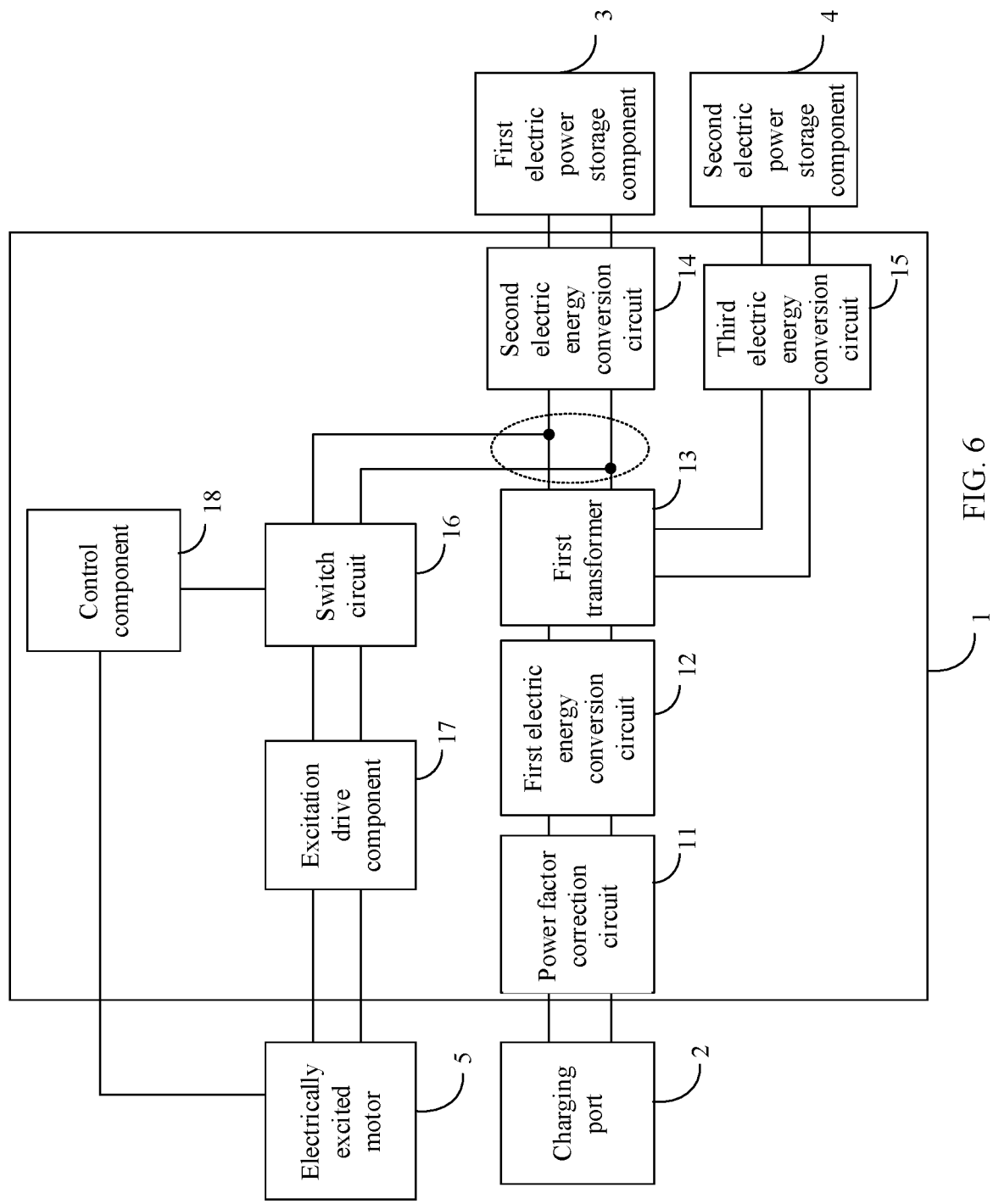
FIG. 6 is a schematic diagram of a structure of an embodiment of an electrically excited motor drive system integrated with an OBC according to this application.

FIG. 6 is a schematic diagram of a structure of an embodiment of an electrically excited motor drive system integrated with an OBC according to this application. As shown in FIG. 6, an electrically excited motor drive system integrated with an OBC 1 may be used in an electric vehicle, and the electric vehicle includes at least an electrically excited motor 5, a charging port 2, a first electric power storage component 3, and a second electric power storage component 4.

The electrically excited motor 5 is configured to provide power for the electric vehicle, and the motor drive system of the power electronics transformer type shown in FIG. 3 may be used for the electrically excited motor 5. The first electric power storage component 3 and the second electric power storage component 4 are electric power storage apparatuses such as a battery in the electric vehicle. The first electric power storage component 3 and the second electric power storage component 4 may be of a same model or different models. The first electric power storage component 3 and the second electric power storage component 4 may provide a same voltage or different voltages. In an embodiment, the first electric power storage component 3 is configured to supply power to the electrically excited motor 5. In this case, a working voltage of the first electric power storage component 3 is greater than a working voltage of the second electric power storage component 4. In other words, a voltage of electric energy that can be provided by the first electric power storage component 3 is greater than a voltage of electric energy that can be provided by the second electric power storage component 4.

According to the electrically excited motor drive system integrated with an OBC 1 provided in this embodiment, a power supply circuit in which an electric power storage component supplies power to the electrically excited motor is integrated with a charging circuit in which the electric power storage component is charged by using a charging port, so that the electrically excited motor drive system 1 can be configured to implement at least two functions: supplying power to the electrically excited motor by obtaining electric energy of the electric power storage component, and charging the electric power storage component. Function 1: The electrically excited motor drive system 1 is used as a charging circuit to perform bidirectional charging between the charging port 2 and both the first electric power storage component 3 and the second electric power storage component 4. Function 2: The electrically excited motor drive system 1 is used as a power supply circuit to transmit, to the electrically excited motor 5 and the second electric power storage component 4, electric energy provided by the first electric power storage component 3, so as to supply power to the electrically excited motor 5 and supply power to the second electric power storage component 4.

As shown in FIG. 6, the electrically excited motor drive system integrated with an OBC 1 provided in this embodiment includes a power factor correction circuit 11, a first electric energy conversion circuit 12, a first transformer 13, a second electric energy conversion circuit 14, a third electric energy conversion circuit 15, a switch circuit 16, an excitation drive component 17, and a control component 18. A first terminal of the power factor correction circuit 11 is connected to the charging port 2 of the electric vehicle, a second terminal of the power factor correction circuit 11 is connected to a first terminal of the first electric energy conversion circuit 12, and a second terminal of the first electric energy conversion circuit 12 is connected to a primary-side winding of the first transformer 13. A first secondary-side winding of the first transformer 13 is connected to a first terminal of the second electric energy conversion circuit 14, and a second terminal of the second electric energy conversion circuit 14 is connected to the first electric power storage component 3 of the electric vehicle. A second secondary-side winding of the first transformer 13 is connected to a first terminal of the third electric energy conversion circuit 15, and a second terminal of the third electric energy conversion circuit 15 is connected to the second electric power storage component 4 of the electric vehicle. The first terminal of the second electric energy conversion circuit 14 is further connected to a first terminal of the switch circuit 16, and the first terminal of the switch circuit 16 is further connected to a specified winding of the first transformer 13. A second terminal of the switch circuit 16 is connected to a first terminal of the excitation drive component 17, and a second terminal of the excitation drive component 17 is connected to the electrically excited motor 5 of the electric vehicle. The control component 18 is connected to a control terminal of the switch circuit 16, and is configured to: control the switch circuit 16 to be turned on or turned off.

The power factor correction circuit 11 may be configured to perform conversion between alternating current power at the first terminal of the power factor correction circuit 11 and direct current power at the second terminal of the power factor correction circuit 11. For example, when alternating current power is received at the first terminal of the power factor correction circuit 11, the alternating current power may be converted into direct current power, and then the direct current power is output from the second terminal. Alternatively, when direct current power is received at the second terminal of the power factor correction circuit 11, the direct current power may be converted into alternating current power, and then the alternating current power is output from the first terminal. In some embodiments, in an example embodiment, the power factor correction circuit 11 may be a full-bridge MOS transistor rectifier circuit, a full-bridge diode rectifier circuit, or another type of rectifier circuit.

The first electric energy conversion circuit 12 may be configured to perform conversion between direct current power at the first terminal of the first electric energy conversion circuit 12 and alternating current power at the second terminal of the first electric energy conversion circuit 12. For example, when direct current power is received at the first terminal of the first electric energy conversion circuit 12, the direct current power may be converted into alternating current power, and then the alternating current power is output from the second terminal. Alternatively, when alternating current power is received at the second terminal of the first electric energy conversion circuit 12, the alternating current power may be converted into direct current power, and then the direct current power is output from the first terminal. In some embodiments, in an example embodiment, the first electric energy conversion circuit 12 may be a full-bridge MOS transistor rectifier circuit, a full-bridge diode rectifier circuit, or another type of rectifier circuit.

The first transformer 13 includes an iron core, the primary-side winding around one side of the iron core, and the first secondary-side winding and the second secondary-side winding around the other side of the iron core. In addition, the primary-side winding, the first secondary-side winding, and the second secondary-side winding are not in contact with each other. In this case, with the iron core, the first transformer 13 may transmit alternating current power between windings in a manner in which the windings are not in contact with each other, and change a voltage of the alternating current power. For example, after alternating current power whose voltage value is a first voltage flows through the primary-side winding, alternating current flux is generated in the iron core. Due to the alternating current flux, alternating current power whose voltage value is a second voltage can be generated on the first secondary-side winding, and alternating current power whose voltage value is a third voltage can be generated on the second secondary-side winding. The first voltage and the second voltage are related to quantities of turns of the primary-side winding and the secondary-side winding. The quantity of turns in which the primary-side winding is around the iron core is denoted as n1, and the quantity of turns in which the first secondary-side winding is around the iron core is denoted as n2. In this case, a ratio of the first voltage U1 to the second voltage U2 is equal to a ratio of n1 to n2. A voltage change relationship between other windings is the same, and details are not described again. For another example, after alternating current power whose voltage value is a second voltage flows through the first secondary-side winding, alternating current flux is generated in the iron core. Due to the alternating current flux, alternating current power whose voltage value is a third voltage may be generated on the second secondary-side winding.

In this embodiment, the first voltage is related to a voltage of alternating current power received at the charging port 2, and may be the voltage of alternating current power received at the charging port. The second voltage is related to the first electric power storage component 3, and may be the working voltage of the first electric power storage component 3. The third voltage is related to the second electric power storage component 4, and may be the working voltage of the second electric power storage component 4. A fourth voltage is related to the electrically excited motor 5, and may be a working voltage of the electrically excited motor 5. In addition, specific values of the first voltage, the second voltage, the third voltage, and the fourth voltage are not limited in this application.

The second electric energy conversion circuit 14 may be configured to perform conversion between alternating current power at the first terminal of the second electric energy conversion circuit 14 and direct current power at the second terminal of the second electric energy conversion circuit 14. For example, when alternating current power is received at the first terminal of the second electric energy conversion circuit 14, the alternating current power may be converted into direct current power, and then the direct current power is output from the second terminal. Alternatively, when direct current power is received at the second terminal of the second electric energy conversion circuit 14, the direct current power may be converted into alternating current power, and then the alternating current power is output from the first terminal. In some embodiments, in an example embodiment, the second electric energy conversion circuit 14 may be a full-bridge MOS transistor rectifier circuit, a full-bridge diode rectifier circuit, or another type of rectifier circuit.

The third electric energy conversion circuit 15 may be configured to perform conversion between alternating current power at the first terminal of the third electric energy conversion circuit 15 and direct current power at the second terminal of the third electric energy conversion circuit 15. For example, when alternating current power is received at the first terminal of the third electric energy conversion circuit 15, the alternating current power may be converted into direct current power, and then the direct current power is output from the second terminal. Alternatively, when direct current power is received at the second terminal of the third electric energy conversion circuit 15, the direct current power may be converted into alternating current power, and then the alternating current power is output from the first terminal. In some embodiments, in an example embodiment, the third electric energy conversion circuit 15 may be a full-bridge MOS transistor rectifier circuit, a full-bridge diode rectifier circuit, or another type of rectifier circuit.

The switch circuit 16 is disposed between the second electric energy conversion circuit 14 and the excitation drive component 17, and is configured to: establish a connection relationship between the excitation drive component 17 and the second electric energy conversion circuit 14 during turn-on, and break off the connection relationship between the excitation drive component 17 and the second electric energy conversion circuit 14 during turn-off. In some embodiments, the first terminal of the switch circuit 16 may be connected to a part circled by an oval dashed line in FIG. 6, and the part is located on a path between the first secondary-side winding of the first transformer 13 and the first terminal of the second electric energy conversion circuit 14. Alternatively, the first terminal of the switch circuit 16 may be connected to another secondary-side winding of the first transformer 13. In some embodiments, the switch circuit 16 may include a switching transistor or a circuit structure that has a switching function, for example, a transistor or a MOS transistor.

The excitation drive component 17 may be configured to: convert, into direct current power, alternating current power received at the first terminal of the excitation drive component 17, and output the direct current power to the electrically excited motor 5 by using the second terminal, to drive the electrically excited motor 5 to work. In some embodiments, in an example embodiment, the excitation drive component 17 may include a full-bridge MOS transistor rectifier circuit, a full-bridge diode rectifier circuit, or another type of rectifier circuit, or may include a second transformer. In this way, the excitation drive component 17 may convert, into alternating current power whose voltage value is the fourth voltage, the alternating current power that is received from the second electric energy conversion circuit 14 by using the switch circuit 16, and whose voltage is the second voltage, and then convert the alternating current power into direct current power by using the rectifier circuit, to finally provide the direct current power for the electrically excited motor 5.

The control component 18 is connected to the switch circuit 16, and may be configured to control the switch circuit 16 to be turned on or turned off. In some embodiments, the control component 18 may be an OBC controller or another form of processor, and the OBC controller may send a turn-on signal or a turn-off signal to the switch circuit 16 to control the control component 18 to be turned on or turned off.

More specifically, when the switch circuit 16 is in different states such as a turn-on state or a turn-off state, the electrically excited motor drive system integrated with an OBC 1 shown in FIG. 6 may have at least the following two working modes.

Working mode 1 (which may also be referred to as a charging mode, a bidirectional charging mode, or the like): When the switch circuit 16 is turned off under control of the control component 18, the power factor correction circuit 11, the first electric energy conversion circuit 12, the first transformer 13, the second electric energy conversion circuit 14, and the third electric energy conversion circuit 15 in the electrically excited motor drive system 1 may jointly form a bidirectional charging circuit. In the working mode 1, the charging port 2 can be used to charge the first electric power storage component 3 and the second electric power storage component 4 by using the bidirectional charging circuit, and the first electric power storage component 3 can also charge the device connected to the charging port 2 and the second electric power storage component 4 by using the bidirectional charging circuit.

When the electrically excited motor drive system 1 is in the working mode 1 and the charging port 2 is connected to an external alternating current power supply, the external alternating current power supply connected to the charging port 2 may charge the first electric power storage component 3 and the second electric power storage component 4 by using the bidirectional charging circuit in the electrically excited motor drive system 1.

Alternating current power obtained at the charging port 2 may be converted by the power factor correction circuit 11 into direct current power, and then the direct current power is converted by the first electric energy conversion circuit 12 into the alternating current power whose voltage is the first voltage, to supply the alternating current power to the primary-side winding of the first transformer 13. The first transformer 13 changes the voltage of the alternating current power whose voltage is the first voltage, and then transmits the alternating current power to the first secondary-side winding and the second secondary-side winding. In addition, the first secondary-side winding and the second secondary-side winding respectively provide, for the connected second electric energy conversion circuit 14 and the connected third electric energy conversion circuit 15, the alternating current power whose voltage value is the second voltage and the alternating current power whose voltage value is the third voltage. In this way, the second electric energy conversion circuit 14 converts, into direct current power, the received alternating current power whose voltage value is the second voltage, to charge the first electric power storage component 3, and the third electric energy conversion circuit 15 converts, into direct current power, the received alternating current power whose voltage value is the third voltage, to charge the second electric power storage component 4.

When the electrically excited motor drive system 1 is in the working mode 1 and the charging port 2 is connected to another device, for example, is connected to another electric vehicle, the first electric power storage component 3 may charge the another device connected to the charging port 2 and the second electric power storage component 4 by using the bidirectional charging circuit in the electrically excited motor drive system 1.

Direct current power provided by the first electric power storage component 3 is converted by the second electric energy conversion circuit 14 into the alternating current power whose voltage value is the second voltage, to supply the alternating current power to the first secondary-side winding of the first transformer 13. The first transformer 13 may change the voltage of the alternating current power whose voltage value is the second voltage and that is on the first secondary-side winding of the first transformer 13, and then transmit the alternating current power to the primary-side winding and the second secondary-side winding. In addition, the primary-side winding transmits, to the connected first electric energy conversion circuit 12, the alternating current power whose voltage is the first voltage. In this way, the first electric energy conversion circuit 12 converts the alternating current power into direct current power, and then outputs the direct current power to the power factor correction circuit 11; and finally, the power factor correction circuit 11 converts the direct current power into alternating current power, and then outputs the alternating current power by using the charging port 2, to charge the another device connected to the charging port 2. The second secondary-side winding transmits, to the connected third electric energy conversion circuit 15, the alternating current power whose voltage is the third voltage, so that the third electric energy conversion circuit 15 converts the received alternating current power into direct current power, to charge the second electric power storage component 4.

Working mode 2 (which may also be referred to as a power supply mode, a drive mode, a motor drive mode, or the like): When the switch circuit 16 is turned on, the second electric energy conversion circuit 14, the switch circuit 16, the excitation drive component 17, the electrically excited motor 5, and the third electric energy conversion circuit 15 may jointly form a power supply circuit. In the working mode 2, the charging port 2 is not connected to an external alternating current power supply.

Direct current power provided by the first electric power storage component 3 is converted by the second electric energy conversion circuit 14 into the alternating current power whose voltage value is the second voltage, and then the alternating current power is transmitted to the excitation drive component 17 by using the switch circuit 16 that is turned on. The excitation drive component 17 converts, into the direct current power whose voltage value is the fourth voltage, the received alternating current power whose voltage value is the second voltage, to supply power to the electrically excited motor 5. In addition, the alternating current power whose voltage value is the second voltage and that is output by the second electric energy conversion circuit 14 is further supplied to the first transformer 13, and the first transformer 13 converts, into the alternating current power whose voltage value is the third voltage, the alternating current power whose voltage value is the second voltage, and then transmits the alternating current power to the third electric energy conversion circuit 15, so that the third electric energy conversion circuit 15 converts the received alternating current power into direct current power, to supply power to the second electric power storage component 4.

In some embodiments, the control component 18 in this embodiment may be configured to control the switch circuit 16 to be turned off or turned on. For example, when detecting that there is a current at the charging port 2, the control component 18 may control the switch circuit 16 to be turned off, so that the electrically excited motor drive system 1 is in the working mode 1; or when detecting a start signal of the electric vehicle or detecting another signal that can be used to determine that the electric vehicle is started, the control component 18 may control the switch circuit 16 to be turned on, so that the electrically excited motor drive system 1 is in the working mode 2.

In conclusion, according to the electrically excited motor drive system integrated with an OBC provided in this embodiment, the power supply circuit that is in the electric vehicle and that is configured to drive the electrically excited motor can be integrated with an OBC of a DAB type. Therefore, when the control component controls the switch circuit, the electrically excited motor drive system obtained after integration can separately implement a function of the power supply circuit or a function of the charging circuit in different working modes. In addition, as shown in FIG. 6, when the electrically excited motor drive system is in different working modes, some circuits such as the second electric energy conversion circuit are further reused through time division. Therefore, this resolves a problem that the power supply circuit cannot be integrated with the OBC of the DAB type, to reduce circuit complexity and costs of the electric vehicle, and further improve experience of a user whose purchases the electric vehicle.

Figure 7:
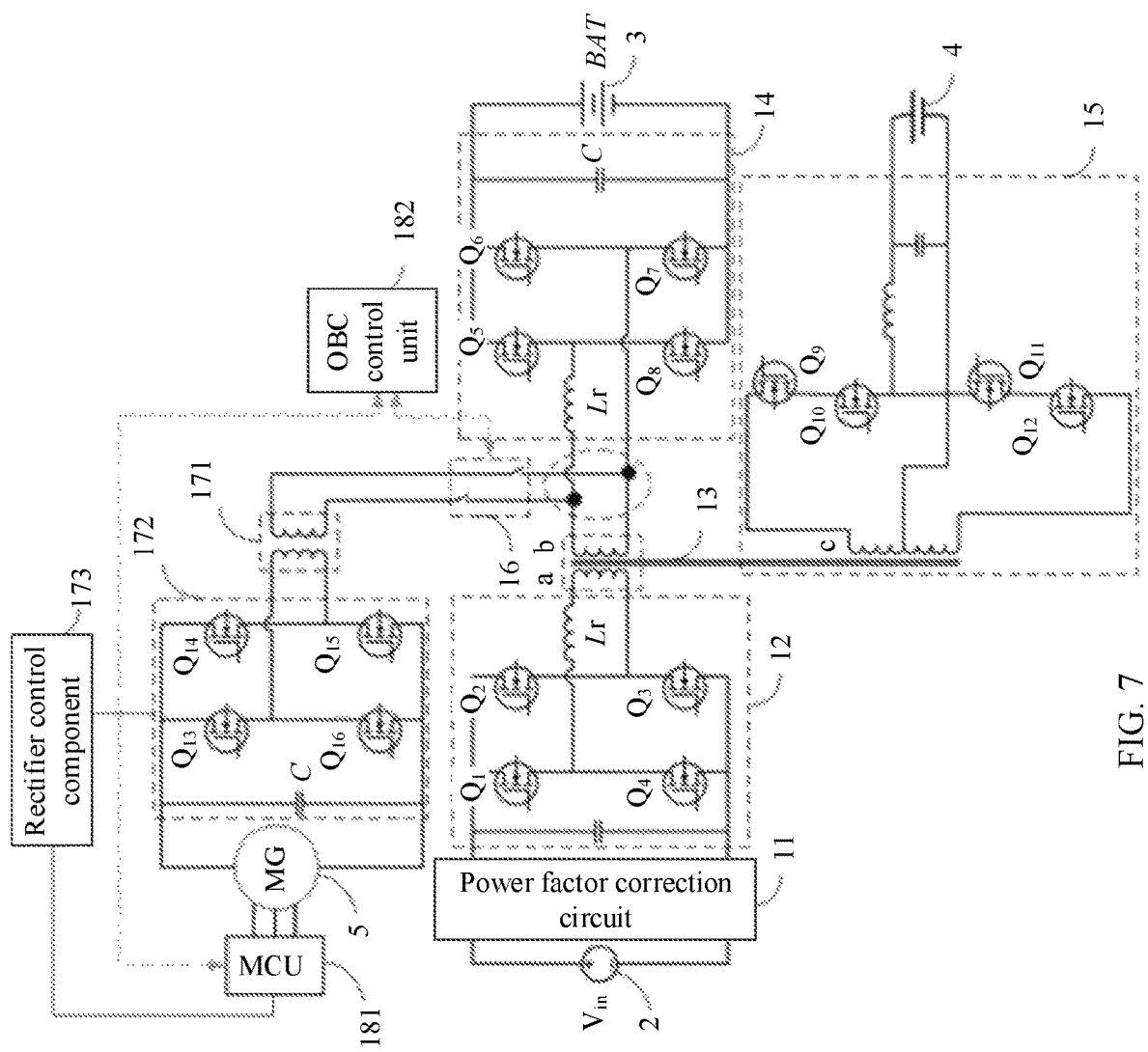
FIG. 7 is a schematic diagram of a circuit structure of an embodiment of an electrically excited motor drive system integrated with an OBC according to this application.

In an example embodiment, FIG. 7 is a schematic diagram of a circuit structure of an embodiment of an electrically excited motor drive system integrated with an OBC according to this application. FIG. 7 shows a circuit embodiment of the electrically excited motor drive system integrated with an OBC shown in FIG. 6.

As shown in FIG. 7, the first electric energy conversion circuit 12 may be a full-bridge MOS transistor rectifier circuit that includes four MOS transistors numbered Q1 to Q4. The MOS transistors Q1 to Q4 are connected to form a bridge circuit. Two direct current sides of the bridge circuit are connected to the PFC circuit 11, and two alternating current sides are connected to the primary-side winding a of the first transformer 13. Specifically, the first electric energy conversion circuit 12 includes a DC-AC conversion circuit including the MOS transistor Q1, the MOS transistor Q2, the MOS transistor Q4, and the MOS transistor Q3. A first terminal of the MOS transistor Q1 is connected to the first terminal of the power factor correction circuit 11, and a second terminal of the MOS transistor Q1 is connected to a first terminal of the primary-side winding a of the first transformer 13. A first terminal of the MOS transistor Q2 is connected to the first terminal of the power factor correction circuit 11, and a second terminal of the MOS transistor Q2 is connected to a second terminal of the primary-side winding a of the first transformer 13. A first terminal of the MOS transistor Q4 is connected to the first terminal of the primary-side winding a of the first transformer 13, and a second terminal of the MOS transistor Q4 is connected to the second terminal of the power factor correction circuit 11. A first terminal of the MOS transistor Q3 is connected to the second terminal of the primary-side winding a of the first transformer 13, and a second terminal of the MOS transistor Q3 is connected to the second terminal of the power factor correction circuit 11.

In this case, when the first electric energy conversion circuit 12 receives direct current power that is transmitted by the power factor correction circuit 11 and whose first terminal is positive and second terminal is negative, in a first cycle (denoted as a positive half cycle of alternating current power), the MOS transistor Q1 and the MOS transistor Q3 are turned on, and the MOS transistor Q2 and the MOS transistor Q4 are turned off, so that the alternating current power whose first terminal is positive and second terminal is negative is transmitted to the primary-side winding a of the first transformer 13. In a second cycle (denoted as a negative half cycle of alternating current power), the MOS transistor Q2 and the MOS transistor Q4 are turned on, and the MOS transistor Q1 and the MOS transistor Q3 are turned off, so that alternating current power whose first terminal is negative and second terminal is positive is transmitted to the primary-side winding a of the first transformer 13. In this way, in an entire cycle of alternating current power, alternating current power to be transmitted to the primary-side winding a is formed, and positive and negative electrodes of the alternating current power alternate based on the first cycle and the second cycle. Therefore, the direct current power of the power factor correction circuit 11 may be converted into the alternating current power to be transmitted to the primary-side winding a.

When the first electric energy conversion circuit 12 receives alternating current power transmitted by the primary-side winding a, in a positive half cycle of alternating current power, the MOS transistor Q1 and the MOS transistor Q3 are turned on, and the MOS transistor Q2 and the MOS transistor Q4 are turned off, so that direct current power whose first terminal is positive and second terminal is negative is transmitted to the power factor correction circuit 11. In a negative half cycle of alternating current power, the MOS transistor Q2 and the MOS transistor Q4 are turned on, and the MOS transistor Q1 and the MOS transistor Q3 are turned off, so that the direct current power whose first terminal is positive and second terminal is negative can also be transmitted to the power factor correction circuit 11. Therefore, the alternating current power transmitted by the primary-side winding a may be converted into the direct current power to be transmitted to the power factor correction circuit 11.

In some embodiments, in the first electric energy conversion circuit 12, a rectifier control component, for example, a controller such as a drive IC, may be connected to a control terminal of each of the MOS transistor Q1, the MOS transistor Q2, the MOS transistor Q3, and the MOS transistor Q4, and is configured to control the MOS transistor to be turned on or turned off.

The second electric energy conversion circuit 14 may be a full-bridge MOS transistor rectifier circuit that includes four MOS transistors numbered Q5 to Q8. The MOS transistors Q5 to Q8 are connected to form a bridge circuit. Two alternating current sides of the bridge circuit are connected to the secondary-side winding b of the first transformer 13, and two direct current sides are connected to the first electric power storage component 3. A manner in which the four MOS transistors in the second electric energy conversion circuit 14 are connected to the secondary-side winding b and the first electric power storage component 3 that are on two sides is the same as a connection manner of the four MOS transistors in the first electric energy conversion circuit 12. In this case, a bridge rectifier circuit is formed, and the MOS transistor Q5 and the MOS transistor Q7 are turned on while the MOS transistor Q6 and the MOS transistor Q8 are turned off, or the MOS transistor Q5 and the MOS transistor Q7 are turned off while the MOS transistor Q6 and the MOS transistor Q8 are turned on. In this way, mutual conversion between direct current power and alternating current power is implemented. An embodiment and a principle thereof are the same, and details are not described again.

The third electric energy conversion circuit 15 may be a MOS transistor full-wave rectifier circuit that includes four MOS transistors numbered Q9 to Q12. Two alternating current sides of a bridge circuit are connected to the secondary-side winding c of the first transformer 13, and two direct current sides are connected to the second electric power storage component 4. Specifically, the secondary-side winding c of the first transformer 13 is divided into two equal-sized single-phase half-wave rectifier circuits based on a central tap. A first terminal of the secondary-side winding c of the first transformer 13, the MOS transistor Q9, the MOS transistor Q10, and the first terminal of the second electric power storage component 4 are successively connected. A second terminal of the secondary-side winding c of the first transformer 13, the MOS transistor Q12, the MOS transistor Q11, and the first terminal of the second electric power storage component 4 are successively connected. The central tap of the secondary-side winding c of the first transformer 13 is connected to the second terminal of the second electric power storage component 4. In this case, when the third electric energy conversion circuit 15 receives alternating current power of the secondary-side winding c, in a positive half cycle of alternating current power, the MOS transistor Q9 and the MOS transistor Q10 are turned on, and the MOS transistor Q11 and the MOS transistor Q12 are turned off, so that direct current power whose first terminal is positive and second terminal is negative can be provided for the second electric power storage component 4. In a negative half cycle of alternating current power, the MOS transistor Q11 and the MOS transistor Q12 are turned on, and the MOS transistor Q9 and the MOS transistor Q10 are turned off, so that the direct current power whose first terminal is positive and second terminal is negative can also be provided for the second electric power storage component 4. Therefore, mutual conversion between direct current power and alternating current power is implemented. In some embodiments, in some embodiments, the third electric energy conversion circuit 15 may be a full-bridge MOS transistor rectifier circuit. An embodiment and a principle thereof are the same as those of the first electric energy conversion circuit 12, and details are not described again.

The specified winding of the first transformer 13 that is connected to the first terminal of the switch circuit 16 may be the first secondary-side winding b of the first transformer 13 that is connected to the second electric energy conversion circuit 14. The first terminal of the switch circuit 16 may be connected to a part circled by an oval dashed line in FIG. 7, and the part is located on a path between the first secondary-side winding b of the first transformer 13 and the first terminal of the second electric energy conversion circuit 14. In some embodiments, the switch circuit 16 may include two switching transistors. The two switching transistors are disposed between two terminals of a primary-side winding of the second transformer 171 and two terminals of the secondary-side winding b of the first transformer 13. The switching transistor may be a transistor, a MOS transistor, a relay, an insulated gate bipolar transistor (IGBT), or the like.

The excitation drive component 17 includes the second transformer 171 and a fourth electric energy conversion circuit 172. The second transformer 171 includes an iron core, the primary-side winding around one side of the iron core, and a secondary-side winding around the other side of the iron core. In addition, the primary-side winding and the secondary-side winding are not in contact with each other. In this case, with the iron core, the second transformer 171 may transmit alternating current power between the primary-side winding and the secondary-side winding in a manner in which the windings are not in contact with each other, and change a voltage of the alternating current power. For example, the primary-side winding of the second transformer 171 is connected to the second terminal of the switch circuit 16. The secondary-side winding of the second transformer 171 is connected to a first terminal of the fourth electric energy conversion circuit 172, and a second terminal of the fourth electric energy conversion circuit 172 is connected to the electrically excited motor 5. In this case, the second transformer 171 may receive, by using the switch circuit, the alternating current power that is from the second electric energy conversion circuit and whose voltage value is the second voltage, generate, on the secondary-side winding, the alternating current power whose voltage value is the fourth voltage, and then transmit the alternating current power to the fourth electric energy conversion circuit.

The fourth electric energy conversion circuit 172 may be a full-bridge MOS transistor rectifier circuit that includes four MOS transistors numbered Q13 to Q16. The MOS transistors Q13 to Q16 are connected to form a bridge circuit. Two alternating current sides of the bridge circuit are connected to the secondary-side winding of the second transformer 171, and two direct current sides are connected to the electrically excited motor 5. A manner in which the four MOS transistors in the fourth electric energy conversion circuit 172 are connected to the secondary-side winding of the second transformer and the electrically excited motor 5 that are on two sides is the same as a connection manner of the four MOS transistors in the first electric energy conversion circuit 12. In this case, a bridge rectifier circuit is formed, and the MOS transistor Q13 and the MOS transistor Q15 are turned on while the MOS transistor Q14 and the MOS transistor Q16 are turned off, or the MOS transistor Q13 and the MOS transistor Q15 are turned off while the MOS transistor Q14 and the MOS transistor Q16 are turned on. In this way, the alternating current power received by the fourth electric energy conversion circuit 172 from the secondary-side winding of the second transformer 171 is converted into direct current power, and then the direct current power is output to the electrically excited motor. An embodiment and a principle thereof are the same, and details are not described again.

The control component 18 includes an OBC controller 182. The OBC controller 182 is connected to a motor control unit (MCU) 181 of the electrically excited motor 5, the MCU 181 is connected to the electrically excited motor 5, and the OBC controller 182 is connected to the switch circuit 16. The MCU 181 may send a switching instruction to the OBC controller 182, so that the OBC controller 182 controls, based on the received switching instruction, the switch circuit 16 to be turned on or turned off.

In some embodiments, the excitation drive component 17 may further include a rectifier control component 173 that is connected to the MCU 181 and the fourth electric energy conversion circuit 172. The MCU 181 may send a rectifier instruction to the rectifier control component 173. In this way, the rectifier control component 173 controls, based on the received rectifier instruction, the MOS transistors Q13 to Q16 in the fourth electric energy conversion circuit 172 to be turned on or turned off, to implement a rectifier function of the full-bridge MOS transistor rectifier circuit.

In conclusion, in the electrically excited motor drive system provided in the embodiment in FIG. 7, electric energy conversion circuits connected to the charging port, the first electric power storage component, the second electric power storage component, and the electrically excited motor all may be full-bridge MOS transistor rectifier circuits. In this way, working modes of all the electric energy conversion circuits during rectification are of an active controllable type. In addition, when the first electric power storage component supplies power to the electrically excited motor, electric energy conversion circuits on two sides of the second transformer may be implemented by using a DAB topology.

Figure 8:
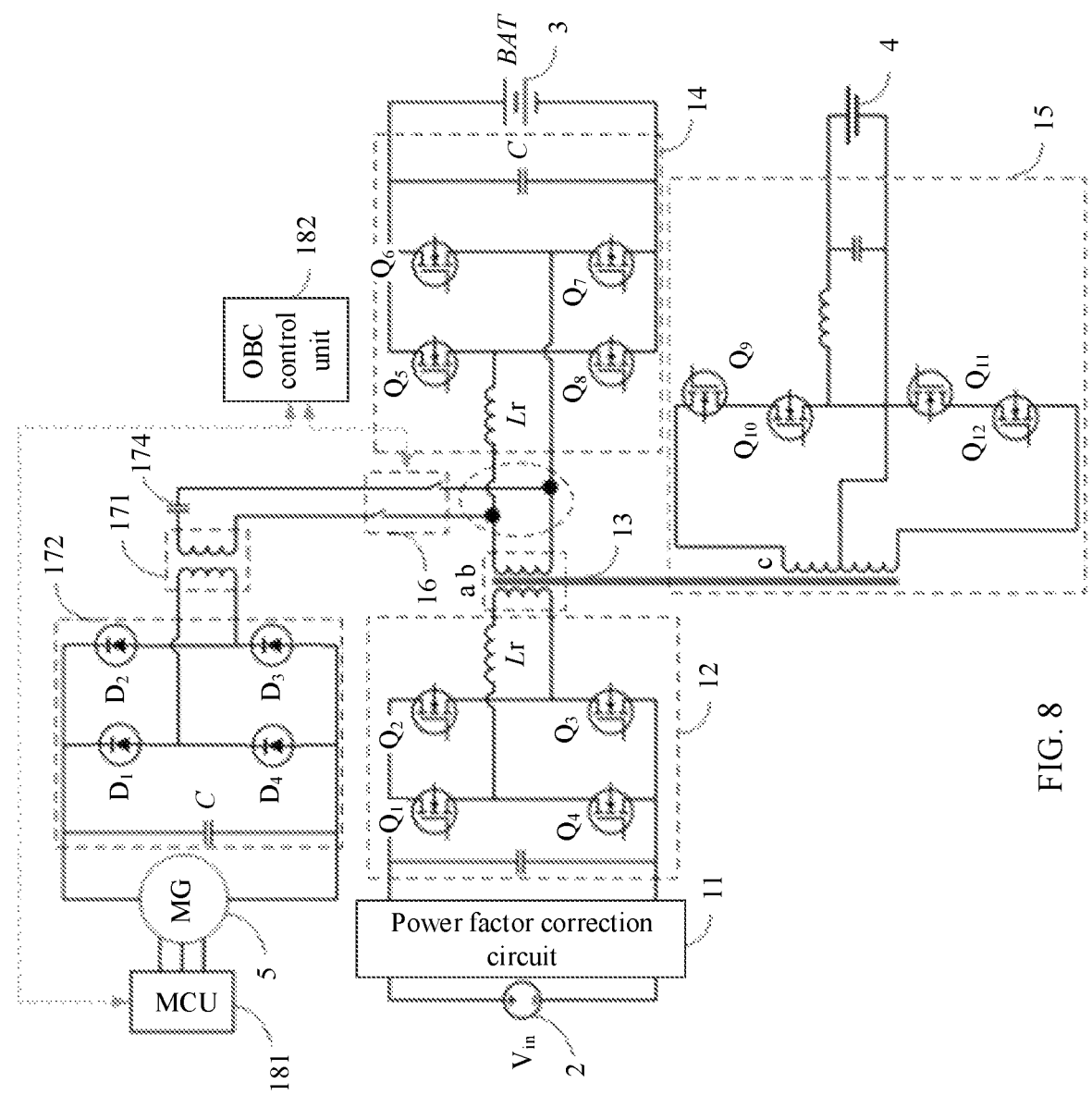
FIG. 8 is a schematic diagram of a circuit structure of another embodiment of an electrically excited motor drive system integrated with an OBC according to this application.

In another example embodiment, FIG. 8 is a schematic diagram of a circuit structure of another embodiment of an electrically excited motor drive system integrated with an OBC according to this application. FIG. 8 shows another example circuit embodiment of the electrically excited motor drive system integrated with an OBC shown in FIG. 6.

An example embodiment in the embodiment shown in FIG. 8 is the same as an example embodiment of the first electric energy conversion circuit 12, the first transformer 13, the second electric energy conversion circuit 14, the third electric energy conversion circuit 15, the switch circuit 16, the control component 18, the second transformer 171, and the like in the embodiment shown in FIG. 7, and details are not described again.

A difference between the embodiment shown in FIG. 8 and the embodiment shown in FIG. 7 is as follows: The fourth electric energy conversion circuit 172 may be a full-bridge diode rectifier circuit that includes four diodes numbered D1 to D4. The diodes D1 to D4 are connected to form a bridge circuit. Alternating current sides of the bridge circuit are connected to the secondary-side winding of the second transformer 171, and two direct current sides are connected to the electrically excited motor 5.

Specifically, the fourth electric energy conversion circuit 172 includes an AC-DC conversion circuit including the diode D1, the diode D2, the diode D4, and the diode D3. A cathode of the diode D1 is connected to a first terminal of the electrically excited motor 5, and an anode of the diode D1 is connected to a first terminal of the secondary-side winding of the second transformer 171. A cathode of the diode D2 is connected to the first terminal of the electrically excited motor 5, and an anode of the diode D2 is connected to a second terminal of the secondary-side winding of the second transformer 171. A cathode of the diode D4 is connected to the first terminal of the secondary-side winding of the second transformer 171, and an anode of the diode D4 is connected to a second terminal of the electrically excited motor 5. A cathode of the diode D3 is connected to the second terminal of the secondary-side winding of the second transformer 171, and an anode of the diode D3 is connected to the second terminal of the electrically excited motor 5.

In this case, when the fourth electric energy conversion circuit 172 receives alternating current power transmitted by the secondary-side winding of the second transformer 171, in a positive half cycle of alternating current power, the diode D1 and the diode D3 are turned on, and the diode D2 and the diode D4 are turned off, so that direct current power whose first terminal is positive and second terminal is negative is transmitted to the electrically excited motor 5 by using the diode D1 and the diode D3. In a negative half cycle of alternating current power, the diode D2 and the diode D4 are turned on, and the diode D1 and the diode D3 are turned off, so that the direct current power whose first terminal is positive and second terminal is negative can also be transmitted to the electrically excited motor 5 by using the diode D2 and the diode D4. Therefore, the alternating current power transmitted by the second transformer 171 may be converted into direct current power to be transmitted to the electrically excited motor.

In addition, in the electrically excited motor drive system shown in FIG. 8, the excitation drive component 17 further includes a capacitor 174, and the capacitor 174 may be a resonant capacitor. The capacitor 174 is disposed at any one of two terminals by which the switch circuit 16 and the second transformer 171 are connected.

In the electrically excited motor drive system provided in the embodiment in FIG. 8, the fourth electric energy conversion circuit connected to the electrically excited motor is a full-bridge diode rectifier circuit. Because the diode rectifier circuit does not have a frequency adjustment capability, the rectifier control component 173 shown in FIG. 7 is not disposed in the system shown in FIG. 8. Therefore, in the system shown in FIG. 8, when the first electric power storage component 3 supplies power to the electrically excited motor 5 successively by using the second electric energy conversion circuit 14, the switch circuit 16, the second transformer 171, and the fourth electric energy conversion circuit 172, the OBC controller 182 needs to adjust, when the second electric energy conversion circuit 14 works in an inversion manner, a frequency of alternating current power that is output by the second electric energy conversion circuit 14. For example, a turn-on frequency and a turn-off frequency of the MOS transistor may be controlled to adjust the frequency of the alternating current power to obtain a frequency required by the electrically excited motor 5. In this case, the OBC controller 182 is equivalent to replacing the fourth electric energy conversion circuit 172 to perform a frequency adjustment operation. Compared with a manner in which an OBC controller in an existing motor drive system including those in FIG. 1 to FIG. 7 can perform only processing such as duty cycle adjustment and phase shift, a "frequency adjustment" function of adjusting the frequency of the alternating current power is added, so that the OBC controller 182 in this embodiment correspondingly has a control function "frequency adjustment+duty cycle adjustment+phase shift". Therefore, the OBC controller 182 can replace some other circuit modules to perform more control on the motor drive system, to reduce circuit complexity.

Figure 9:
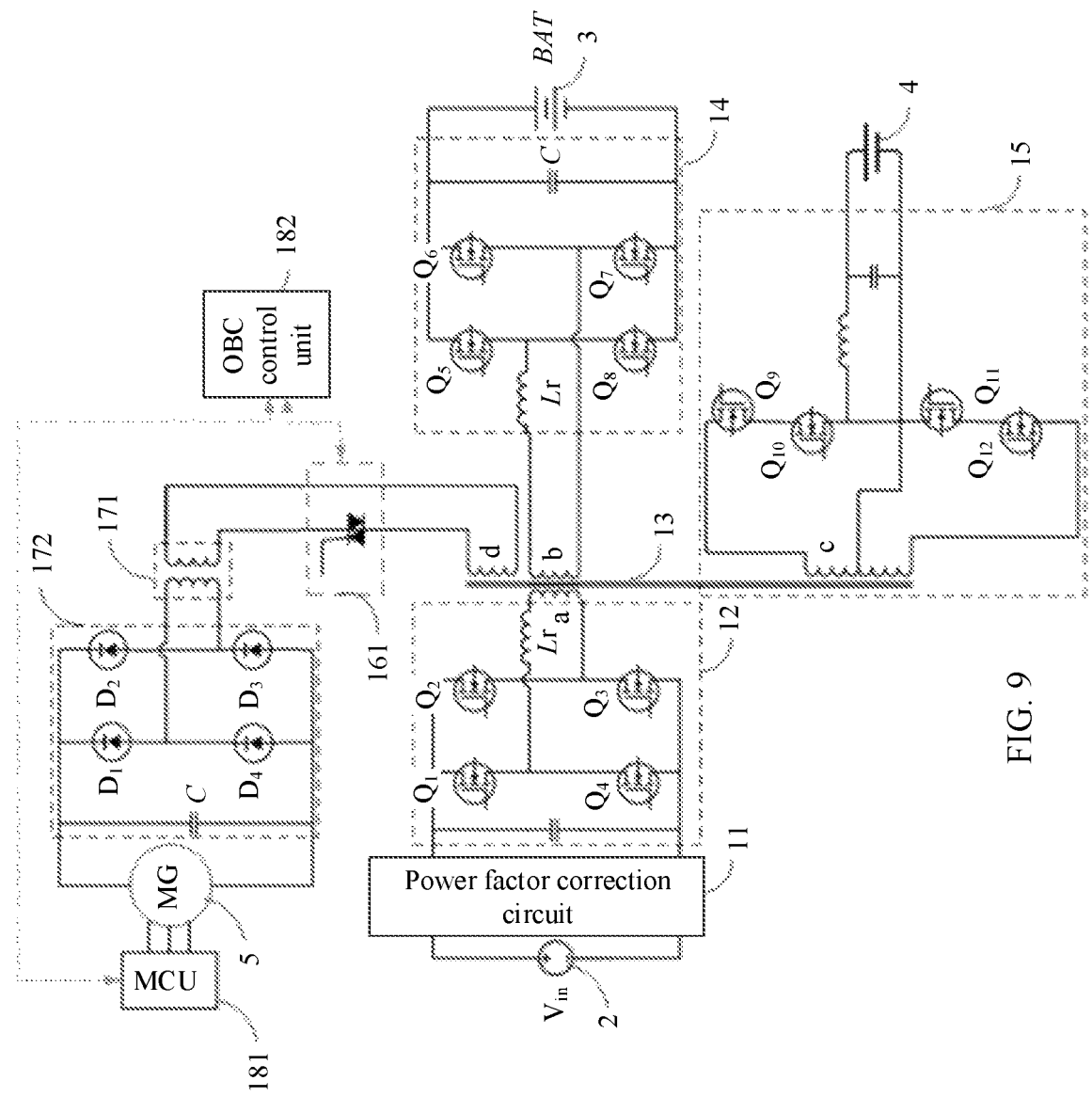
FIG. 9 is a schematic diagram of a circuit structure of still another embodiment of an electrically excited motor drive system integrated with an OBC according to this application.

In still another example embodiment, FIG. 9 is a schematic diagram of a circuit structure of still another embodiment of an electrically excited motor drive system integrated with an OBC according to this application. FIG. 9 shows still another example circuit embodiment of the electrically excited motor drive system integrated with an OBC shown in FIG. 6.

An example embodiment in the embodiment shown in FIG. 9 is the same as an example embodiment of the first electric energy conversion circuit 12, the second electric energy conversion circuit 14, the third electric energy conversion circuit 15, the control component 18, the second transformer 171, and the like in the embodiment shown in FIG. 7, and details are not described again.

A difference between the embodiment shown in FIG. 9 and the embodiment shown in FIG. 7 is as follows: The switch circuit 16 includes a voltage regulation circuit 161, and the voltage regulation circuit 161 is disposed between two terminals of the primary-side winding of the second transformer 171 and two terminals of the secondary-side winding b of the first transformer 13. The specified winding of the first transformer 13 that is connected to the first terminal of the switch circuit 16 is a fourth terminal, namely, a secondary-side winding d of the first transformer 13, denoted as a third secondary-side winding. The third secondary-side winding d of the first transformer 13 is disposed on a same side of the iron core as the first secondary-side winding b and the second secondary-side winding c, and the third secondary-side winding d, the first secondary-side winding b, the second secondary-side winding c, and the primary-side winding a are not in contact with each other.

The fourth electric energy conversion circuit 172 may be a full-bridge diode rectifier circuit that includes four diodes numbered D1 to D4. The diodes D1 to D4 are connected to form a bridge circuit. Alternating current sides of the bridge circuit are connected to the secondary-side winding of the second transformer 171, and two direct current sides are connected to the electrically excited motor 5. An example embodiment and a principle of the fourth electric energy conversion circuit 172 are the same as those of the fourth electric energy conversion circuit 172 shown in FIG. 8, and details are not described again.

In this embodiment, the voltage regulation circuit 161 may be configured to: regulate a voltage of alternating current power transmitted by the secondary-side winding d of the first transformer 13 to the primary-side winding of the second transformer 171, and control the first transformer 13 and the second transformer 171 to be connected to or disconnected from each other.

In conclusion, in the electrically excited motor drive system provided in the embodiment in FIG. 9, the fourth electric energy conversion circuit connected to the electrically excited motor may be a full-bridge diode rectifier circuit. In this way, when the first electric power storage component supplies power to the electrically excited motor, for electric energy conversion circuits on two sides of the second transformer, the second electric energy conversion circuit may adjust a frequency of alternating current power. Although the fourth electric energy conversion circuit cannot directly adjust the frequency, the frequency of the alternating current power may be adjusted by regulating a voltage by the voltage regulation circuit, so that a frequency of alternating current power on the two sides of the second transformer is adjustable. In this way, this is "equivalent to"

that the voltage regulation circuit enables electric energy conversion circuits on the two sides of the second transformer to be implemented by using controllable DAB topologies on the two sides. This embodiment can enrich an embodiment of a circuit structure of the electrically excited motor drive system, and increase design flexibility.

This application further provides an electric vehicle, including an electrically excited motor and an electrically excited motor drive system integrated with an OBC provided in any one of the foregoing embodiments of this application.

A person of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An electrically excited motor drive system integrated with an on-board charger (OBC), used in an electric vehicle, and comprising:
   a power factor correction circuit, a first electric energy conversion circuit, a first transformer, a second electric energy conversion circuit, a third electric energy conversion circuit, a switch circuit, an excitation drive component, and a control component, wherein:
   a first terminal of the power factor correction circuit is connected to a charging port of the electric vehicle, and a second terminal of the power factor correction circuit is connected to a first terminal of the first electric energy conversion circuit;
   the first transformer comprises a primary-side winding, a first secondary-side winding, and a second secondary-side winding, and the primary-side winding, the first secondary-side winding, and the second secondary-side winding are not in contact with each other;
   a second terminal of the first electric energy conversion circuit is connected to the primary-side winding of the first transformer, the first secondary-side winding of the first transformer is connected to a first terminal of the second electric energy conversion circuit, and a second terminal of the second electric energy conversion circuit is connected to a first electric power storage component of the electric vehicle;
   the second secondary-side winding of the first transformer is connected to a first terminal of the third electric energy conversion circuit, and a second terminal of the third electric energy conversion circuit is connected to a second electric power storage component of the electric vehicle;
   the first terminal of the second electric energy conversion circuit is further connected to a first terminal of the switch circuit, the first terminal of the switch circuit is further connected to a specified winding of the first transformer, a second terminal of the switch circuit is connected to a first terminal of the excitation drive component, and a second terminal of the excitation drive component is connected to an electrically excited motor of the electric vehicle;
   the control component is connected to a control terminal of the switch circuit, and is configured to control the switch circuit to be turned on or turned off; and
   when the switch circuit is turned off:
      the power factor correction circuit is configured to receive alternating current power from the charging port, convert the alternating current power into direct current power, and then transmit the direct current power to the first electric energy conversion circuit;
      the first electric energy conversion circuit is configured to: receive the direct current power from the power factor correction circuit, convert the direct current power into alternating current power, and then transmit the alternating current power to the primary-side winding of the first transformer;
      the first transformer is configured to receive, by using the primary-side winding, alternating current power that is from the first electric energy conversion circuit and whose voltage value is a first voltage, generate, on the first secondary-side winding, alternating current power whose voltage value is a second voltage, then transmit the alternating current power to the second electric energy conversion circuit, generate, on the second secondary-side winding, alternating current power whose voltage value is a third voltage, and then transmit the alternating current power to the third electric energy conversion circuit;
      the second electric energy conversion circuit is configured to receive the alternating current power from the first secondary-side winding, convert the alternating current power into direct current power, and then transmit the direct current power to the first electric power storage component; and
      the third electric energy conversion circuit is configured to receive the alternating current power from the second secondary-side winding, convert the alternating current power into direct current power, and then transmit the direct current power to the second electric power storage component; or
   when the switch circuit is turned on:
      the second electric energy conversion circuit is configured to: receive direct current power from the first electric power storage component, convert the direct current power into alternating current power, and then transmit the alternating current power to the first secondary-side winding of the first transformer and the excitation drive component;
      the excitation drive component is configured to receive the alternating current power from the second electric energy conversion circuit, convert the alternating current power into direct current power, and then transmit the direct current power to the electrically excited motor;
      the first transformer is configured to receive, by using the first secondary-side winding, alternating current power that is from the second electric energy conversion circuit and whose voltage value is a second voltage, generate, on the second secondary-side winding, alternating current power whose voltage value is a third voltage, and then transmit the alternating current power to the third electric energy conversion circuit; and the third electric energy conversion circuit is configured to: receive the alternating current power from the second secondary-side winding, convert the alternating current power into direct current power, and then transmit the direct current power to the second electric power storage component.

2. The electrically excited motor drive system according to claim 1, wherein the excitation drive component comprises a second transformer and a fourth electric energy conversion circuit, wherein:

the second transformer comprises a primary-side winding and a secondary-side winding, and the primary-side winding and the secondary-side winding of the second transformer are not in contact with each other;

the primary-side winding of the second transformer is connected to the second terminal of the switch circuit, the secondary-side winding of the second transformer is connected to a first terminal of the fourth electric energy conversion circuit, and a second terminal of the fourth electric energy conversion circuit is connected to the electrically excited motor;

the second transformer is configured to receive, by using the primary-side winding of the second transformer, the alternating current power that is from the second electric energy conversion circuit and whose voltage value is the second voltage, generate, on the secondary-side winding of the second transformer, alternating current power whose voltage value is a fourth voltage, and then transmit the alternating current power to the fourth electric energy conversion circuit; and the fourth electric energy conversion circuit is configured to receive the alternating current power from the secondary-side winding of the second transformer, convert the alternating current power into direct current power, and then transmit the direct current power to the electrically excited motor.

3. The electrically excited motor drive system according to claim 2, wherein the specified winding is the first secondary-side winding of the first transformer.

4. The electrically excited motor drive system according to claim 3, wherein the fourth electric energy conversion circuit comprises a full-bridge metal-oxide semiconductor (MOS) transistor rectifier circuit.

5. The electrically excited motor drive system according to claim 4, wherein the excitation drive component further comprises:

a rectifier control component, connected to a motor control unit (MCU) of the electric vehicle and the full-bridge MOS transistor rectifier circuit, wherein the rectifier control component is configured to: receive a rectifier instruction of the MCU, and control, based on the rectifier instruction, MOS transistors in the full-bridge MOS transistor rectifier circuit to be turned on or turned off.

6. The electrically excited motor drive system according to claim 4, wherein:

the excitation drive component further comprises a capacitor, a first terminal of the capacitor is connected to the second terminal of the switch circuit, and a second terminal of the capacitor is connected to a terminal of the primary-side winding of the second transformer; and the fourth electric energy conversion circuit comprises a full-bridge diode rectifier circuit.

7. The electrically excited motor drive system according to claim 2, wherein:

the first transformer further comprises a third secondary-side winding, and the third secondary-side winding, the primary-side winding of the first transformer, the first secondary-side winding, and the second secondary-side winding are not in contact with each other; and the specified winding is the third secondary-side winding.

8. The electrically excited motor drive system according to claim 7, wherein:

the switch circuit comprises a voltage regulation circuit, configured to regulate a voltage of alternating current power that is input to the primary-side winding of the second transformer; and the fourth electric energy conversion circuit comprises a full-bridge diode rectifier circuit.

9. The electrically excited motor drive system according to claim 1, wherein:

the control component comprises an OBC controller, and the OBC controller is connected to a motor control unit (MCU) of the electric vehicle and the switch circuit; and the OBC controller is configured to receive a switching instruction of the MCU, and control, based on the switching instruction, the switch circuit to be turned on or turned off.

10. An electric vehicle, comprising an electrically excited motor and an electrically excited motor drive system integrated with an on-board charger (OBC), wherein the electrically excited motor drive system comprises a power factor correction circuit, a first electric energy conversion circuit, a first transformer, a second electric energy conversion circuit, a third electric energy conversion circuit, a switch circuit, an excitation drive component, and a control component, wherein:

a first terminal of the power factor correction circuit is connected to a charging port of the electric vehicle, and a second terminal of the power factor correction circuit is connected to a first terminal of the first electric energy conversion circuit;

the first transformer comprises a primary-side winding, a first secondary-side winding, and a second secondary-side winding, and the primary-side winding, the first secondary-side winding, and the second secondary-side winding are not in contact with each other;

a second terminal of the first electric energy conversion circuit is connected to the primary-side winding of the first transformer, the first secondary-side winding of the first transformer is connected to a first terminal of the second electric energy conversion circuit, and a second terminal of the second electric energy conversion circuit is connected to a first electric power storage component of the electric vehicle;

the second secondary-side winding of the first transformer is connected to a first terminal of the third electric energy conversion circuit, and a second terminal of the third electric energy conversion circuit is connected to a second electric power storage component of the electric vehicle;

the first terminal of the second electric energy conversion circuit is further connected to a first terminal of the switch circuit, the first terminal of the switch circuit is further connected to a specified winding of the first transformer, a second terminal of the switch circuit is connected to a first terminal of the excitation drive component, and a second terminal of the excitation drive component is connected to an electrically excited motor of the electric vehicle;

the control component is connected to a control terminal of the switch circuit, and is configured to control the switch circuit to be turned on or turned off; and when the switch circuit is turned off:
- the power factor correction circuit is configured to receive alternating current power from the charging port, convert the alternating current power into direct current power, and then transmit the direct current power to the first electric energy conversion circuit;
- the first electric energy conversion circuit is configured to receive the direct current power from the power factor correction circuit, convert the direct current power into alternating current power, and then transmit the alternating current power to the primary-side winding of the first transformer;
- the first transformer is configured to receive, by using the primary-side winding, alternating current power that is from the first electric energy conversion circuit and whose voltage value is a first voltage, generate, on the first secondary-side winding, alternating current power whose voltage value is a second voltage, then transmit the alternating current power to the second electric energy conversion circuit, generate, on the second secondary-side winding, alternating current power whose voltage value is a third voltage, and then transmit the alternating current power to the third electric energy conversion circuit;
- the second electric energy conversion circuit is configured to receive the alternating current power from the first secondary-side winding, convert the alternating current power into direct current power, and then transmit the direct current power to the first electric power storage component; and
- the third electric energy conversion circuit is configured to receive the alternating current power from the second secondary-side winding, convert the alternating current power into direct current power, and then transmit the direct current power to the second electric power storage component; or when the switch circuit is turned on:
- the second electric energy conversion circuit is configured to: receive direct current power from the first electric power storage component, convert the direct current power into alternating current power, and then transmit the alternating current power to the first secondary-side winding of the first transformer and the excitation drive component;
- the excitation drive component is configured to: receive the alternating current power from the second electric energy conversion circuit, convert the alternating current power into direct current power, and then transmit the direct current power to the electrically excited motor;
- the first transformer is configured to: receive, by using the first secondary-side winding, alternating current power that is from the second electric energy conversion circuit and whose voltage value is a second voltage, generate, on the second secondary-side winding, alternating current power whose voltage value is a third voltage, and then transmit the alternating current power to the third electric energy conversion circuit; and
- the third electric energy conversion circuit is configured to: receive the alternating current power from the second secondary-side winding, convert the alternating current power into direct current power, and then transmit the direct current power to the second electric power storage component.

11. The electric vehicle according to claim 10, wherein the excitation drive component comprises
a second transformer and a fourth electric energy conversion circuit, wherein:
- the second transformer comprises a primary-side winding and a secondary-side winding, and the primary-side winding and the secondary-side winding of the second transformer are not in contact with each other;
- the primary-side winding of the second transformer is connected to the second terminal of the switch circuit, the secondary-side winding of the second transformer is connected to a first terminal of the fourth electric energy conversion circuit, and a second terminal of the fourth electric energy conversion circuit is connected to the electrically excited motor;
- the second transformer is configured to receive, by using the primary-side winding of the second transformer, the alternating current power that is from the second electric energy conversion circuit and whose voltage value is the second voltage, generate, on the secondary-side winding of the second transformer, alternating current power whose voltage value is a fourth voltage, and then transmit the alternating current power to the fourth electric energy conversion circuit; and
- the fourth electric energy conversion circuit is configured to receive the alternating current power from the secondary-side winding of the second transformer, convert the alternating current power into direct current power, and then transmit the direct current power to the electrically excited motor.

12. The electric vehicle according to claim 11, wherein the specified winding is the first secondary-side winding of the first transformer.

13. The electric vehicle according to claim 12, wherein the fourth electric energy conversion circuit comprises a full-bridge metal-oxide semiconductor (MOS) transistor rectifier circuit.

14. The electric vehicle according to claim 13, wherein the excitation drive component further comprises:
a rectifier control component, connected to a motor control unit (MCU) of the electric vehicle and the full-bridge MOS transistor rectifier circuit, wherein
the rectifier control component is configured to receive a rectifier instruction of the MCU, and control, based on the rectifier instruction, MOS transistors in the full-bridge MOS transistor rectifier circuit to be turned on or turned off.

15. The electric vehicle according to claim 13, wherein:
the excitation drive component further comprises a capacitor, a first terminal of the capacitor is connected to the second terminal of the switch circuit, and a second terminal of the capacitor is connected to a terminal of the primary-side winding of the second transformer; and
the fourth electric energy conversion circuit comprises a full-bridge diode rectifier circuit.

16. The electric vehicle according to claim 11, wherein:
the first transformer further comprises a third secondary-side winding, and the third secondary-side winding, the primary-side winding of the first transformer, the first secondary-side winding, and the second secondary-side winding are not in contact with each other; and
the specified winding is the third secondary-side winding.

17. The electric vehicle according to claim 16, wherein:
the switch circuit comprises a voltage regulation circuit, configured to regulate a voltage of alternating current power that is input to the primary-side winding of the second transformer; and
the fourth electric energy conversion circuit comprises a full-bridge diode rectifier circuit.

18. The electric vehicle according to claim 10, wherein:
the control component comprises an OBC controller, and the OBC controller is connected to a motor control unit (MCU) of the electric vehicle and the switch circuit; and
the OBC controller is configured to receive a switching instruction of the MCU, and control, based on the switching instruction, the switch circuit to be turned on or turned off.

* * * * *